Nov. 8, 1938.  A. A. THOMAS  2,136,223
TORSION INDICATOR
Filed Nov. 27, 1931  2 Sheets-Sheet 1
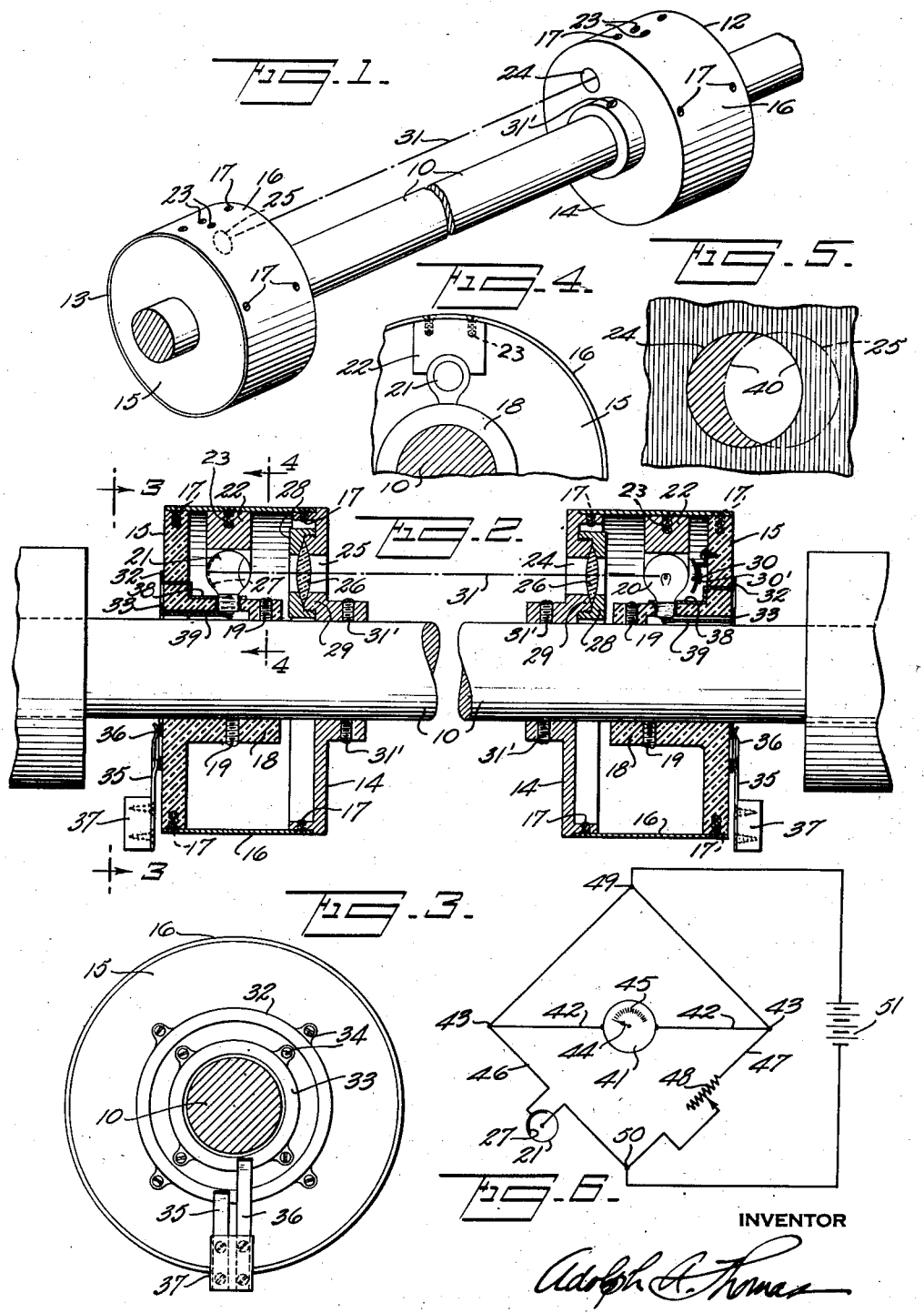

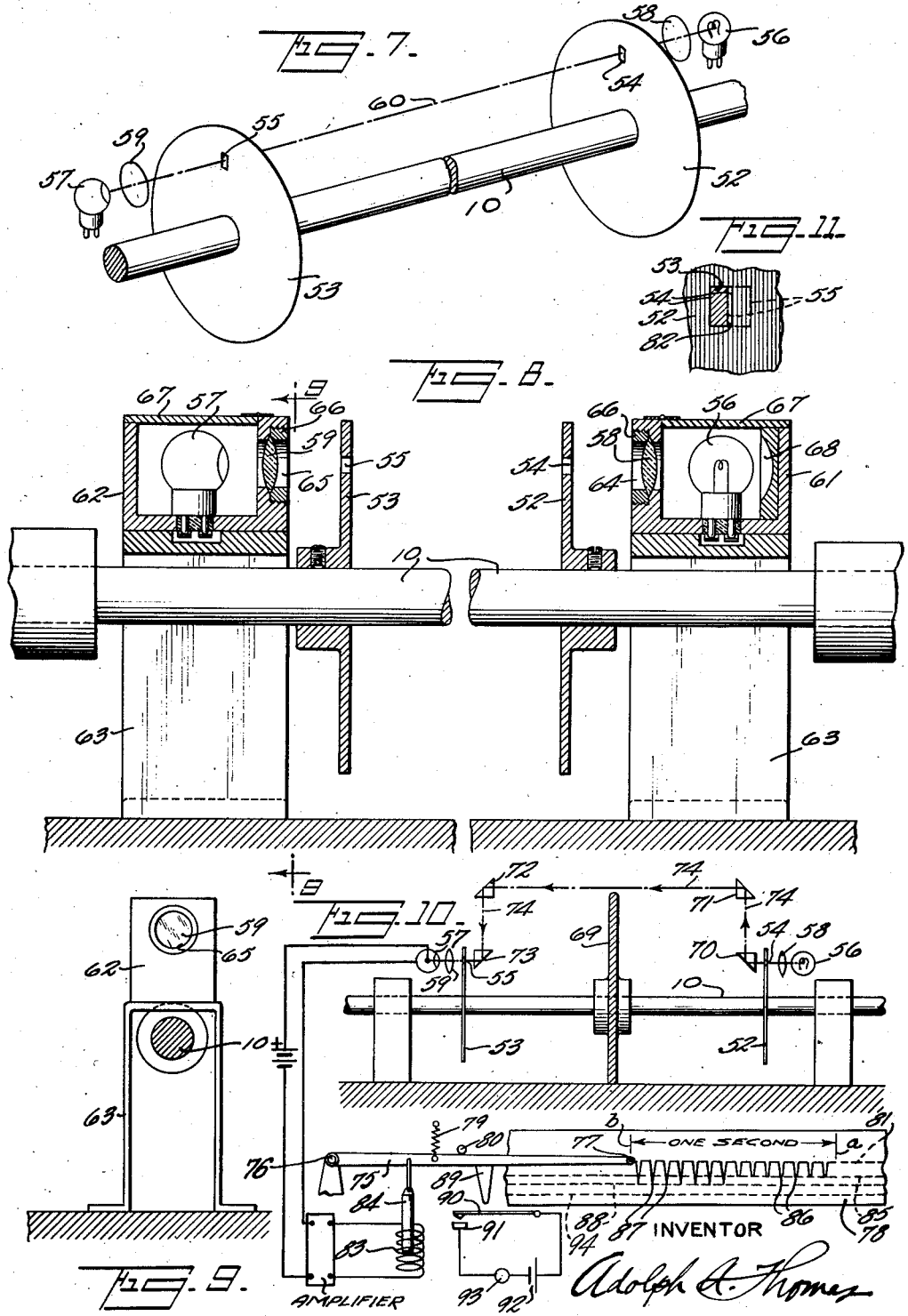

Patented Nov. 8, 1938

2,136,223

UNITED STATES PATENT OFFICE 2,136,223

TORSION INDICATOR

Adolph A. Thomas, New York, N. Y.

Application November 27, 1931, Serial No. 577,440

16 Claims. (Cl. 265—25)

This invention relates to the art of measuring the amount of torsion to which a rotating shaft or other twistable member is subjected. One of the basic features of my invention comprises photo-electric means affected by the torsional or twisting movement of the shaft for electrically controlling a suitable instrument which indicates the degree of torsion or its mechanical equivalent, and in a preferred embodiment I employ means for recording not only the torsion but also the speed of the shaft.

In a simple form of my invention, I mount a pair of disks a certain distance apart on the shaft or other member to be tested for torsion. Each disk has a hole or slit for the passage of light, and the disks are so arranged that the holes normally permit either a maximum or a minimum quantity of light to pass through. Behind one disk is a lamp and behind the other is a photo-electric cell, which controls a suitable indicator or recorder. The lamp and the cell are mounted on stationary supports, independently of the shaft, and preferably enclosed in light-proof boxes. Normally, when the shaft is stationary or otherwise free from torsion, a certain amount of light strikes the photo-electric cell which is so connected in circuit that the indicator or recorder stands at zero. When the shaft is subjected to torsional strain, the amount or intensity of light striking the cell through the openings in the disks is varied in strict accordance with the angle of torsion, and the amount of current in the indicating circuit is varied correspondingly. In another form of my invention I mount the lamp and the photo-electric cell directly on the shaft, whereby a continuous indication of the torsion is obtained. I may also provide automatic means for operating a signal or other suitable device when the torsion of the shaft reaches a permissible limit.

The device of my invention is exceedingly sensitive, simple and cheap to construct, and easy to apply. The indicating or recording instrument may be conveniently located at any distance from the place of testing. The novel features and practical advantages of my invention will be understood from a description of the accompanying drawings, in which—

Fig. 1 is a perspective view of one form of my new torsion-measuring apparatus mounted on a shaft;

Fig. 2 represents an enlarged axial view thereof in section;

Figs. 3 and 4 are transverse sections on lines 3—3 and 4—4 of Fig. 2;

Fig. 5 is a fragmentary face view of the light-controlling disks to indicate in an exaggerated way the overlapping of the holes due to the torsion of the shaft;

Fig. 6 is a diagram of circuit connections whereby the photo-electric cell controls a torsion meter;

Fig. 7 shows a simplified embodiment of my invention in a diagrammatic way;

Fig. 8 is a sectional side view of the same arrangement;

Fig. 9 is a section on line 9—9 of Fig. 8;

Fig. 10 shows still another modification;

Fig. 11 shows diagrammatically the normal axial positions of the light slits in the arrangement of Figs. 7 and 8.

Referring to Figs. 1–4, the shaft 10 represents any member whose torsion is to be measured, and upon this shaft are rigidly mounted two boxes 12 and 13 a certain distance apart. Since these two boxes are alike in construction, a detailed descriptiton of one will do for both. As shown in Fig. 2, each box consists of a pair of end disks 14 and 15 and a cylindrical cover 16 which is secured to the disks by screws 17 or otherwise. The parts 14, 15 and 16 may be made from sheet metal, but it is desirable to mold the disks 15 of insulating material of the Bakelite type. The disks 15 are each provided with a hub or sleeve 18, which is secured to shaft 10 in any practical way, as by one or more set-screws 19. The hub 18 in casing 12 has a socket for receiving an electric lamp 20, and the hub 18 in the other casing 13 has a socket for receiving a photo-electric cell 21, which may be of any practical construction. The cover 16 of each casing carries a block 22 shaped to fit snugly over lamp 20 and cell 21, whereby those two parts are firmly held against radial displacement during the rotation of shaft 10. The blocks 22 are attached by screws 23 or otherwise, and are preferably of wood, fiber, or other material that will not injure the tubes.

The disks 14 are provided with a pair of holes or slits 24 and 25, which are shown circular, but which may have any other practical shape. A lens or system of lenses 26 is carried by the disk 14 of each casing to project a beam or pencil of parallel rays from lamp 20 to the light-sensitive cathode 27 of the photo-electric cell 21. The converging lenses 26 are conveniently held in place by rings 28, which are screwed to annular projections 29 formed inside the disks. A reflector 30 may be arranged back of lamp 20 to concentrate the light through the lens system 26. It is convenient to attach the reflector 30 to a bracket 30' carried by the rear disk 15 of casing 12. In Figs. 1 and 2, the dotted line 31 indicates diagrammatically the path of light from lamp 20 to cell 21. If necessary or desirable, the disks 14 may be separately secured to shaft 10 by set-screws 31', or otherwise, but usually the attachment of the disks to covers 16 will be sufficient.

Each insulated disk 15 carries on the outside a pair of conductor rings 32 and 33, which are secured in concentric relation by screws 34 or in any other practical way. With each pair of conductor rings 32—33 is associated a pair of brushes or contact fingers 35 and 36, which are mounted on a stationary insulating support 37. The collector rings 32 and 33 of each casing are connected to contact strips or wires 38 and 39. In casing 12 the conductor 38 is connected to the metal shell or socket in which the electric lamp 20 is mounted, and the other conductor 39 engages the central contact of the lamp. The same description applies to the connection of conductors 38 and 39 in box 13 with the two electrodes of the photo-electric cell 21. Any other practical arrangement may be used for holding the lamp 20 and cell 21 in circuit during the rotation of shaft 10.

The casings 12 and 13 are fixed in such position on shaft 10 that normally a certain quantity or intensity of light strikes the cathode 27 of cell 21. By arranging the openings 24—25 in substantially perfect alignment when the shaft stands still, the normal amount or intensity of light that reaches the cell 21 is a maximum. On the other hand, it is also possible to fix the casings 12—13 in such positions that the openings 24—25 are normally out of alignment to a predetermined extent, so that normally the amount of light reaching the photo-electric cell is a minimum. In the first instance, it is clear that the relative radial displacement of the normally aligned openings 24—25 due to the torsion of the shaft will decrease the amount of transmitted light proportionately to the angle of torsion. In the second instance, the amount of light striking the cell increases proportionately to the increase of the degree of torsion which the shaft undergoes. In either case, however, it is true that the amount or intensity of light that reaches the cell 21 from lamp 20 varies proportionately to the torsional or twisting movement of the shaft. Thus, in the diagrammatic illustration of Fig. 5, it may be assumed that the slits or openings 24—25 were normally in perfect alignment and have been displaced by the torsional movement of the shaft through a certain angle, so that the effective opening for the light is now reduced to the area 40. On the other hand, we may assume that the openings 24—25 normally overlap to present the free area 40 for the passage of light, and this area will either increase or decrease in accordance with the torsional movements of the shaft, depending upon the direction of rotation thereof.

Any practical means may be employed to utilize the variable operation of photo-electric cell 21 for indicating the amount of torsion or its mechanical equivalent, such as the amount of power conveyed through the shaft from the engine end to the load end. Fig. 6 shows a Wheatstone bridge arrangement for causing the photo-electric cell 21 to control a torsion indicator 41. It will not be necessary to show or describe the structural details of this indicator, because such devices are well known in the art. It is enough to say that the indicator 41 has a coil connected to the conductors 42 which go to the equi-potential points 43 of the Wheatstone bridge. The indicating member 44 of the instrument 41 may be a pointer movable over a suitable scale 45. The photo-electric cell 21 is connected in the branch 46 of the bridge, and the opposite branch 47 includes an adjustable resistance 48. The opposing points 49—50 of the Wheatstone bridge are connected to the terminals of a battery 51, or other source of constant current.

The resistance 48 is so adjusted that, in the normal position of casings 12—13, the indicating or recording member 44 stands at zero. Now, as the shaft 10 is subjected to torsion during its rotation, the relative displacement of openings 24—25 causes a corresponding variation in the conductivity of cell 21, so that the normal electric balance of branches 46 and 47 is disturbed and current flows through the indicator 41. Consequently, the member 44 moves to a position for correctly indicating or recording the amount of torsion or some mechanical equivalent thereof. The instrument 41 may be located in a convenient place at any distance from shaft 10. We may suppose, for example, that the shaft 10 is a propeller shaft on a ship and that it is desired to test the behavior of the shaft under various load and speed conditions. The indicator 41 may be located in the office of the chief engineer. By leaving the boxes 12—13 on the shaft for days or during the entire trip, the engineer can tell the torsional condition of the shaft at any moment by simply looking at the indicator. By thus watching the shaft, it is possible to avoid an overload or overstrain, and also to ascertain whether the shaft has the required strength to carry out its intended operation with a proper factor of safety. Photo-electric cells are so sensitive to light variations that the slightest torsion or twisting of the shaft is indicated by instrument 41.

In the modification shown in Figs. 7, 8 and 9, the shaft 10 carries a pair of disks 52 and 53, which have slits 54 and 55 for the passage of light from the electric lamp 56 to the photo-electric cell 57. A system of interposed lenses indicated diagrammatically at 58 and 59 serves to concentrate the light into a beam or pencil of substantially parallel rays represented by the dotted line 60 in Fig. 7. The lamp 56 and photo-electric cell 57 are housed in suitable boxes 61 and 62, which are supported independently of shaft 10 in any practical way, as by means of U-shaped stands 63. The boxes 61 and 62 have light openings 64 and 65 in which the lenses 58 and 59 are mounted by screw rings 66 or otherwise. The disks 52—53 are so positioned on shaft 10 that the light slits 54—55 normally permit a certain quantity or intensity of light to reach the cell 57. Each box 61—62 has a hinged cover 67 for easy access to the interior. A reflector 68 in box 61 may be employed to concentrate the light of lamp 56 through the lens system 58.

When the space between the disks 52—53 is clear, the light from lamp 56 goes to cell 57 directly in a straight line, as indicated in Fig. 7. If in any particular installation it should happen that there is an obstruction between disks 52—53, it is only necessary to use mirrors or prisms to direct the light over the obstruction. Such an arrangement is shown diagrammatically in Fig. 10, where the wall 69 prevents the light from passing in a straight line through the slits 54—55 of disks 52 and 53. A system of reflectors represented by four prisms or mirrors 70—73 causes the light from lamp 56 to pass along a right-angled path indicated diagrammatically by the dotted line 74.

The operation of the photo-electric system shown in Figs. 7—10 is precisely the same as that of the construction illustrated in Figs. 1 and 2, so that I need not repeat the previous explanation. The only difference between the two modifications lies in the method of indicating the amount of distortion to which the shaft 10 is subjected. In Figs. 1 and 2 the lamp 20 and cell 21 are mounted in fixed relation to the light openings 24 and 25 respectively, so that the cell is continuously activated. This arrangement provides a continuous indication of the torsion by means of the pointer 44 and scale 45. However, in the modification of Figs. 7—10, the photo-electric cell 57 is activated once in every revolution of shaft 10. It is therefore desirable to use a type of torsion meter having a recording member adapted to be actuated every time the cell is energized. A suitable instrument of this kind is diagrammatically shown in Fig. 10, where an arm 75 is pivoted at 76 and carries a recording point 77 arranged to move over a strip 78 of paper or like material. The strip 78 may be wound on a pair of reels driven by clockwork or other motor mechanism at a certain rate of feed. For purposes of illustration it may be assumed that the distance between the points a and b represents an interval of one second. A contracting coil spring 79 normally holds the recording arm 75 against a fixed stop 80, so that in the normal position of arm 75, the recording point 77 coincides with line 81 on the paper strip 78.

The disks 52 and 53 are so positioned on shaft 10 that normally the controlling slits 54 and 55 have a minimum overlap, as shown on an exaggerated scale in the diagram of Fig. 11, where the overlapping area forms a slit 82 for the passage of a normal minimum amount of light to the sensitized electrode of cell 57. As the shaft 10 is subjected to torsion, the overlapping of slits 54—55 increases with a corresponding increase in the area of the effective slit 82. Consequently, a greater amount of light strikes the cell 57 and causes a correspondingly greater current to pass through a solenoid coil 83, which may be directly connected in the circuit of the cell or across the equipotential points 43 of the Wheatstone bridge shown in Fig. 6. The coil 83 operates a magnetic plunger 84 attached to the recording arm 75. It has been assumed in Fig. 10 that the dotted line 85 represents zero torsion. That is to say, we have supposed that the normal minimum amount of light striking the cell 57 through the overlap 82 causes the coil 83 to be traversed by a current of such strength that the recording point 77 touches the zero line 85 at the peaks 86. When the shaft 10 is subjected to torsion, the overlap 82 of slits 54—55 increases proportionately and results in a correspondingly greater current passing through coil 83. Consequently, the arm 75 will be swung through a greater angle and the writing point 77 will trace a line whose peaks 87 touch the torsion line 88. The recording instrument is so calibrated that the line 88 represents a certain degree of torsion or its mechanical equivalent. By looking at the record 78, an engineer can tell how the shaft was behaving during different periods of the day and night, and also under different speed conditions, since the peaks 86 and 87 also indicate the speed of the shaft.

I may also provide means for automatically operating a signal when the torsion of shaft 10 reaches a dangerous point. In Fig. 10, the recording arm 75 is provided with an insulated extension 89 arranged to actuate a normally open switch arm 90 when a predetermined maximum amount of current passes through coil 83, which means that the torsion of shaft 10 has risen to a predetermined maximum limit. By this I mean a limit beyond which the operation of shaft 10 can not continue in safety. The switch arm 90 may be a spring finger normally held by inherent tension away from a stationary contact 91. The normally open switch 90—91 is in the circuit of a battery 92 or other source of current, and this circuit includes a suitable operative device 93, which may be an electric bell, a signal light, a loudspeaker adapted to sound a warning, or any other piece of mechanism practical to use in this connection. We may assume that the line 94 on record sheet 78 represents the limit of safety beyond which the torsion should not increase. When the recording point 77 reaches the danger line 94, the recording arm 75 closes the switch arm 90, whereby the device 93 is energized to issue a warning or stop the rotation of shaft 10. This lets the engineer know that a danger point has been reached in the amount of load or torsion imposed upon the shaft.

Although I have shown and described certain specific constructions, I want it understood that my invention is not limited to the details set forth. The basic principle of my torsion-measuring apparatus may doubtless be embodied in various other forms, without departing from the scope of the appended claims. When I speak of a shaft in the claims, I do not necessarily mean a power shaft, although the invention is probably most useful in testing engine-driven shafts, but I use the word to include any member adapted to be tested for torsion.

In referring to the instrument controlled by the photo-electric cell as a torsion indicator, I mean that it indicates, measures or records the degree of torsion or its mechanical equivalent.

I claim as my invention:

1. In torsion-indicating apparatus, the combination of a Wheatstone bridge, an electric torsion indicator connected across the equi-potential points of said bridge, a photo-electric cell in a branch of said bridge, and means controlled by the torsion of a shaft for variably activating said cell, whereby the latter controls said indicator.

2. The combination of a shaft, a stationary electric lamp and a stationary photo-electric cell associated with said shaft, said lamp being arranged to throw a beam of light against said cell, means for automatically varying said beam of light in accordance with the torsion of said shaft, and a torsion indicator controlled by the action of said cell.

3. The combination of a rotary shaft, a pair of disks fixed upon said shaft a certain distance apart, said disks having each an opening for the passage of light, means for sending a beam of light through said openings which are radially displaced in accordance with the torsion of said shaft to vary the intensity of said light beam, a photo-electric cell arranged in the path of said variable light beam, and torsion indicating means controlled by said cell.

4. The combination of a shaft, a pair of casings fixed upon said shaft a certain distance apart, an electric lamp in one casing and a photo-electric cell in the other casing, the adjacent sides of said casings being provided with openings for the passage of light from said lamp to said cell, whereby the intensity or quantity of said light varies in accordance with the relative radial displacement of said openings due to the torsion of said shaft, and torsion indicating means controlled by said cell.

5. The combination of a rotary shaft, means for varying a beam of light in accordance with the torsion of said shaft, photo-electric means affected by said beam of light, and means controlled by said photo-electric means for indicating the degree of torsion.

6. The method of measuring the torsion of a rotating shaft which comprises varying a beam of light in accordance with the torsion of the shaft, utilizing said beam of light to affect photo-electric means, and causing said photo-electric means to control a suitable instrument which indicates the degree of torsion.

7. The combination of a rotary shaft, a movable recording member, and mechanism whereby said member is moved in proportion to the torque exerted on said shaft for making a record of said torque, said mechanism including means for operating said recording member at a frequency depending on the speed of the shaft, whereby said member makes a record from which the speed of the shaft may also be determined.

8. The combination of a rotary shaft, an electro-responsive device, means for energizing said device at a frequency depending on the speed of said shaft, said means also including means whereby the degree of energization of said device is proportional to the torque exerted on said shaft, and a recording member actuated by said device for making spaced marks on a suitable surface, whereby the depth and spacing of said marks are respectively proportional to the torque and the speed of said shaft.

9. The combination of a rotary shaft, an electro-responsive device, means for energizing said device to a degree proportional to the torque exerted on said shaft and at a frequency depending on the speed of the shaft, and a recording member moved by said device for making marks from which the torque as well as the speed of the shaft may be determined.

10. Recording means including a rotary shaft, a circuit, means whereby an electric quantity of said circuit is varied in proportion to the torque exerted on said shaft, an electro-responsive device controlled by said circuit, and a member actuated by said device in accordance with the value of the variable quantity in said circuit for making a record of the torsion to which said shaft is subjected, said recording means also including means for causing impulses in said circuit at a frequency depending on the speed of the shaft, whereby said member makes a record from which the speed of the shaft may also be determined.

11. Recording means including a rotary shaft, a circuit, means whereby the resistance of said circuit is varied in proportion to the torque exerted on said shaft, a recorder having an electro-responsive device controlled by said circuit and a member movable in accordance with the resistance in said circuit for making a record of the torsion to which said shaft is subjected, said recording means also including means for interrupting the flow of current in said circuit at a frequency depending on the speed of the shaft, whereby the recorder makes a record from which the speed of the shaft may also be determined.

12. The combination of a rotary shaft, a stationary source of light, an electric circuit including a stationary photo-electric cell in the path of a light beam from said source, means for varying the quantity or intensity of the light that strikes said cell in proportion to the torque exerted on said shaft, said means also causing said light variations at a frequency depending on the speed of the shaft, an electro-responsive device controlled by said circuit and energized in accordance with the illumination of said photo-electric cell, and a recording member actuated by said device for making marks from which the torque as well as the speed of the shaft may be determined.

13. Recording means including a rotary shaft, a circuit, means whereby the resistance of said circuit is varied in proportion to the torque exerted on said shaft, a recorder having an electro-responsive device controlled by said circuit and a member movable in accordance with the resistance in said circuit for making a record of the torsion to which said shaft is subjected, said recording means also interrupting the flow of current in said circuit at a frequency depending on the speed of the shaft, whereby the recorder makes a record from which the speed of the shaft may also be determined, said resistance-varying means and current-interrupting means including a stationary photo-electric cell in said circuit, a stationary source of light for said cell, and means for varying the quantity or intensity of the light that strikes said cell in proportion to the torsion of said shaft.

14. In torsion measuring apparatus, the combination of a rotary shaft, means for producing a beam of light, a photo-electric device in the path of said beam, means controlled by the torsion of said shaft for varying the quantity or intensity of the light that strikes said device, so that the photo-electric action of said device always corresponds to the torsion of said shaft at any moment, a circuit including said photo-electric device, and electric torsion-indicating mechanism controlled by said circuit.

15. The combination of a rotary power shaft, a pair of disks fixed upon said shaft a certain distance apart and rotatable therewith, each disk having a slit and the two slits being normally in predetermined radial relation, which varies in accordance with the torsion of the rotating shaft, a stationary electric lamp near one of said disks, a stationary photo-electric cell near the other disk, the slits in said disks being arranged to be in alignment during rotation of the shaft, means for directing a beam of light from said lamp through the aligned slits to said cell, the relative displacement of said slits caused by the torsion of the shaft varying proportionately the amount or intensity of the light striking said cell, an electric circuit including said cell, whereby the current flow in said circuit depends on the torsion to which said shaft is subjected, an electromagnetic device controlled by said circuit and energized to a degree proportional to the illumination of said photo-electric cell, and means operated by said device for indicating the torsion of said shaft.

16. In apparatus for indicating the torsion of a rotating power shaft, a photo-electric cell, means for varying the illumination of said photo-electric cell in accordance with the degree of torsion to which the rotating shaft is subjected at any moment, an indicating member, and means controlled by said photo-electric cell for actuating said member to indicate the torsion of said shaft.

ADOLPH A. THOMAS.